(12) United States Patent
Roberts-Hoffman et al.

(10) Patent No.: US 10,234,985 B2
(45) Date of Patent: Mar. 19, 2019

(54) DYNAMIC SPACE BAR

(71) Applicant: Google LLC, Mountain View, CA (US)

(72) Inventors: Katie Leah Roberts-Hoffman, Mountain View, CA (US); Charles Zimmer Mooney, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/429,903

(22) Filed: Feb. 10, 2017

(65) Prior Publication Data

US 2018/0232093 A1 Aug. 16, 2018

(51) Int. Cl.
*G06F 3/041* (2006.01)
*G06F 3/02* (2006.01)
*G06F 3/0354* (2013.01)
*G06F 3/0488* (2013.01)
*G06F 3/0489* (2013.01)
*G06F 3/0484* (2013.01)

(52) U.S. Cl.
CPC .............. *G06F 3/0416* (2013.01); *G06F 3/02* (2013.01); *G06F 3/03547* (2013.01); *G06F 3/0484* (2013.01); *G06F 3/0489* (2013.01); *G06F 3/04886* (2013.01); *G06F 3/04883* (2013.01)

(58) Field of Classification Search
CPC ...... G06F 3/0416; G06F 3/02; G06F 3/03547; G06F 3/04886; G06F 3/04883; G06F 3/0216; G06F 3/0484; G06F 3/0489
See application file for complete search history.

(56) References Cited

U.S. PATENT DOCUMENTS

| | | | |
|---|---|---|---|
| 6,724,370 B2 | 4/2004 | Dutta et al. | |
| 8,436,829 B1 | 5/2013 | Zhai et al. | |
| 8,525,776 B2 | 9/2013 | Challener et al. | |
| 9,019,207 B1 * | 4/2015 | Hamburgen | G06F 1/1662 345/156 |
| 9,041,654 B2 | 5/2015 | Ellard | |
| 2008/0165138 A1 | 7/2008 | Li | |

(Continued)

OTHER PUBLICATIONS

International Search Report and Written Opinion issued in International Application No. PCT/US2017/058288, dated Jan. 5, 2018, 15 pages.

(Continued)

*Primary Examiner* — Tom V Sheng
(74) *Attorney, Agent, or Firm* — Fish & Richardson P.C.

(57) ABSTRACT

Methods, systems, and apparatus, including computer programs encoded on a computer storage medium, for implementing a dynamic space bar are disclosed. In one aspect, a method includes the actions of determining, by a computing device that includes a touchscreen keyboard and trackpad, a context of the computing device. The actions further include receiving touch input on the trackpad. The actions further include designating, by the computing device and based on the previously-determined context of the computing device, the touch input on the trackpad to be a selection of a space bar of the touchscreen keyboard. The actions further include providing, for output to a display of the computing device and based on the computing device having designated the touch input on the trackpad to be a selection of the space bar, an indication of the selection of the space bar.

20 Claims, 5 Drawing Sheets

(56) References Cited

U.S. PATENT DOCUMENTS

| | | |
|---|---|---|
| 2008/0297475 A1 | 12/2008 | Woolf et al. |
| 2011/0018812 A1 | 1/2011 | Baird |
| 2012/0242578 A1* | 9/2012 | Laubach ............... G06F 3/0213 345/160 |
| 2013/0285914 A1 | 10/2013 | Pasquero et al. |
| 2014/0109016 A1* | 4/2014 | Ouyang ................. G06F 17/24 715/856 |
| 2015/0193010 A1 | 7/2015 | Tsukamoto et al. |
| 2015/0261354 A1* | 9/2015 | Hu .......................... G06F 3/044 345/163 |
| 2016/0062644 A1 | 3/2016 | Adams |
| 2018/0067624 A1* | 3/2018 | Laubach ............. G06F 3/04883 |

OTHER PUBLICATIONS

'www.techspot.com' [online] "Lenovo Yoga Book Review Display, Keyboard and Trackpad," Tim Schiesser, Oct. 10, 2016 [retrieved on Dec. 15, 2017] Retrieved from Internet: URL<https://www.techspot.com/review/1257-lenovo-yoga-book/page2.htm> 10 pages.
'news.thewindowsclub.com' [online] "Google wants to remove the space bar from the keyboard," May 4, 2015, [retrieved on Feb. 9, 2017] Retrieved from Internet: URL<http://news.thewindowsclub.com/google-wants-remove-space-bar-keyboard-78039/> 4 pages.

* cited by examiner

DYNAMIC SPACE BAR

FIELD

This specification relates to computer input devices.

BACKGROUND

Laptop computers include a screen that is connected to a keyboard via a hinge. The user types on the keyboard and the corresponding letters appear on the screen. In devices that only include a screen, such as mobile phones or tablets, the screen displays a touch sensitive keyboard that depends on the application running on the device and the state of the application.

SUMMARY

When typing on a touch sensitive keyboard, the user may be more prone to errors because the keyboard does not include any three-dimensional mechanical keys to help orient the user if the user is not looking at the keyboard. With a touch sensitive keyboard, a user may intend to select the space bar, but because the user is not looking at the keyboard and cannot feel the location of the space bar, the user may select the adjacent trackpad that may be located directly below the space bar. This may cause confusion for the user as the cursor may not advance when the user is at the end of a word, even though the user believed that the user selected the space bar. The user may have to reorient the cursor if selecting the trackpad caused the cursor to move elsewhere on the screen.

To remedy this problem, a computing device with a touch sensitive keyboard may dynamically adjust the size of the space bar active area to include a portion of the trackpad that is located directly below the space bar. The computing device may adjust the size of the space bar active area based on the context of the computing device. For example, if the user is typing and is at the end of a complete word, then the computing device may increase the size of the space bar active area. In this case, the user may be more likely to select the space bar than the trackpad. Similarly, if the user is typing and the current word is incomplete, then the computing device may not increase the size of the space bar active area beyond the space bar. In this case, the user may be less likely to select the space bar than if the current word were complete.

According to an innovative aspect of the subject matter described in this application, a method for implementing a dynamic space bar includes the actions of determining, by a computing device that includes a touchscreen keyboard and trackpad, a context of the computing device; receiving touch input on the trackpad; designating, by the computing device and based on the previously-determined context of the computing device, the touch input on the trackpad to be a selection of a space bar of the touchscreen keyboard; and providing, for output to a display of the computing device and based on the computing device having designated the touch input on the trackpad to be a selection of the space bar, an indication of the selection of the space bar.

These and other implementations can each optionally include one or more of the following features. The action of determining a context of the computing device includes determining that a complete word precedes a location of a cursor. The action of designating the touch input on the trackpad to be a selection of a space bar of the touchscreen keyboard is based further on determining that a complete word precedes the cursor. The action of determining a context of the computing device includes determining that the touch input on the trackpad is a tapping action rather than a dragging action. The action of designating the touch input on the trackpad to be a selection of a space bar of the touchscreen keyboard is based further on determining that the touch input on the trackpad is a tapping action rather than a dragging action. The action of determining a context of the computing device includes determining that user fingers are touching a predetermined number of the home keys of the touchscreen keyboard. The action of designating the touch input on the trackpad to be a selection of a space bar of the touchscreen keyboard is based further on determining that the user fingers are touching the predetermined number of the home keys of the touchscreen keyboard.

The action of determining a context of the computing device includes determining that user palms are touching portions of the touchscreen keyboard on either side of the trackpad. The action of designating the touch input on the trackpad to be a selection of a space bar of the touchscreen keyboard is based further on determining that the user palms are touching portions of the touchscreen keyboard on either side of the trackpad. The touchscreen keyboard and the track pad are identified by outlines illustrated on a touch sensitive input device. The display of the computing device and the touch sensitive input device are separate. The touchscreen keyboard depicts a representation of the space bar. The action of receiving touch input on the trackpad includes not receiving the touch input at a location that is within the depicted representation of the space bar. The depicted representation of the space bar is adjacent to and underneath the depicted representation of the space bar. The actions further include determining an additional context of the computing device; receiving additional touch input on the trackpad; designating, by the computing device and based on the additional context, the additional touch input on the trackpad to be a selection of the trackpad; and providing, for output to the display of the computing device and based on the computing device having designated the additional touch input on the trackpad to be a selection of the trackpad, an indication of the selection of the trackpad.

The actions further include receiving another touch input on the space bar; based on designating the additional touch input on the trackpad to be a selection of the trackpad, designating, by the computing device, the other touch input on the space bar to be a selection of the trackpad; and providing, for output to the display of the computing device and based on the computing device having designated the other touch input on the space bar to be a selection of the trackpad, an additional indication of the selection of the trackpad. The action of determining a context of the computing device includes determining that a prefix of a word precedes the cursor. The action of designating the touch input on the trackpad to be a selection of a trackpad is based further on determining that a prefix of a word precedes the cursor. The actions further include, based on receiving the touch input on the trackpad and based on the computing device having designated the touch input on the trackpad to be a selection of the space bar, not performing an action associated with a touchscreen gesture.

Other implementations of this aspect include corresponding systems, apparatus, and computer programs recorded on computer storage devices, each configured to perform the operations of the methods.

The subject matter described in this application may have one or more of the following advantages. A computing device dynamically adjusts the active area that corresponds to the space bar in response to determining that the user is more likely to select the space bar, so that the user is less likely to provide an unintended user input. The dynamic keyboard may be located on a touch sensitive surface, which allows for a thinner keyboard. The touch sensitive keyboard reduces the need for mechanical components, so that the device may be manufactured with less expense and so that the keyboard may be less prone to failure.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference numbers represent corresponding parts throughout.

DETAILED DESCRIPTION

Figure 1:
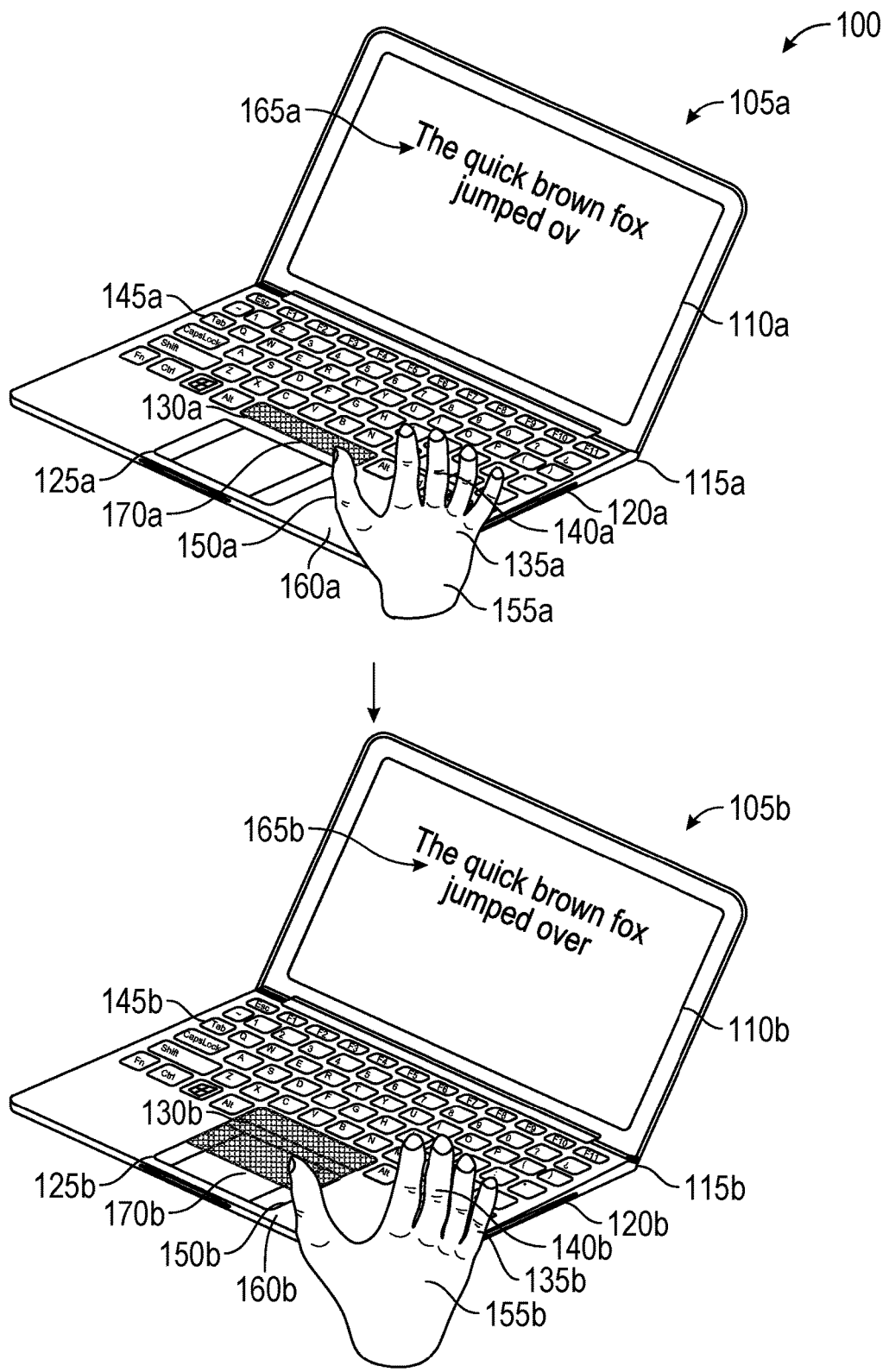
FIGS. 1 and 2 illustrate example computing devices with dynamic space bars.

FIG. 1 illustrates an example computing device 105 with a dynamic space bar. Briefly, and as described in more detail below, the computing device 105 uses the context of the computing device 105 to determine whether a touch input near a space bar is a selection of the space bar or a selection of the trackpad.

As illustrated in FIG. 1, the system 100 includes two instances of the computing device 105. The computing devices 105a and 105b illustrate the user typing the sentence "the quick brown fox jumped over the lazy dog." Computing device 105a illustrates computing device 105 at a time at which the user is in the middle of typing the word "over." Computing device 105b illustrates computing device 105 at a time at which the user has completed typing the word "over."

The computing device 105 is a hinged device that includes a screen 110 on one side of the hinge 115 and a keyboard 120 and trackpad 125 on the other side of the hinge 115. The hinge 115 may be configured to rotate 360 degrees so that, when closed, the screen 110 may face the keyboard 120 or the screen 110 and the keyboard 125 may be facing the outside. Instead of mechanical keys that move up and down and that activate when the user pushes a key down, the keyboard 120 and trackpad 125 may be on a touch sensitive surface. The touch sensitive surface may be resistive or capacitive. To type the word "fox," the user presses the areas of the touch sensitive surface that correspond to the letters "f," "o," and "x."

In some implementations, the keys of the keyboard 120 and the location of the trackpad 125 may be painted or printed on the touch sensitive surface. In this instance, the layout of the keyboard 120 and trackpad 125 may not change as the user interacts with the computing device 105 or folds the computing device 105. The painted keyboard 120 and trackpad 125 remains visible when the computing device 105 is powered off. In some implementations, the keys of the keyboard 120 and the location of the trackpad 125 may be displayed on the touch sensitive surface using a display device. For example, the touch sensitive surface may also include an LCD display to display the keys of the keyboard 120 and the location of the trackpad 125. In this instance, the keys of the keyboard 120 and the location of the trackpad 125 may appear upon the device being powered on. In some implementations, the keys of the keyboard 120 and the location of the trackpad 125 may only appear when the angle of the hinge 115 is within a certain range. If the angle of the hinge is zero degrees when the screen 110 faces the keyboard 120, and 360 degrees when the screen 110 and the keyboard 125 face the outside, then the keys of the keyboard 120 and the location of the trackpad 125 may only appear when the hinge 115 is between ten and 270 degrees, for example. In this manner, the computing device 105 may present keys only when the computing device 105 is not closed and not in a "tablet" mode.

Because the keyboard 120 does not include any mechanical components, the portion of the computing device 105 that includes the keyboard 120 and trackpad 125 may be thinner than other laptop computers. Additionally, removing the mechanical components eliminates the possibility of mechanical problems with the keyboard 120 and may allow for easier cleaning and improved water resistance. In instances where the touch sensitive surface includes a display device, the layout of the keyboard 120 may be easily changeable. For example, the computing device 105 may change the keyboard 120 layout to a layout for a different language or change the display to show any other design.

Another consequence of the keyboard 120 being on a flat, touch-sensitive surface is that a user may not be able to determine what keys the user's fingers are located on or otherwise contacting without looking at the keyboard 120. In some implementations, the keyboard 120 may include one or more raised elements on the keyboard 120 that allow the user to orient the user's hands when placing them on the keyboard 120. Additionally, the computing device 120 may be able to adjust the size of any of the keys in the keyboard 120 or the size of the trackpad 125 according to different contexts. In this instance, the appearance of the keyboard 120 may remain unchanged. Instead, the area of the space bar 130 that, upon selection, corresponds to or otherwise results in a selection of the space bar 130 may increase or decrease in size. Similarly, the computing device 102 may adjust the active area of any other keys or trackpad 125 based on the context of the device.

In the example illustrated in computing device 105a, the user's hands 135a are resting on the keyboard 120a. The user's fingers 140a are resting on the home keys 145a, e.g., "a s d f" for the left hand and "j k l;" for the right hand. In this document, "fingers" will collectively refer to the index, middle, ring, and pinky fingers and not the thumb. The user's thumb 150a may be resting on the space bar 130. The user's palm 155a may be resting on the palm rest 160a.

The computing device 105a is executing a text input application, such as a word processing application or email application. The text input application is running in the foreground and the text input application appears on the screen 110a. Other applications may be running in the background such as system applications and other user applications such as a browser, photo editor, video editor, or other similar application. On computing device 105a, the user has typed the text 165a "the quick brown fox jumped ov." The computing device 105a determines a context of the computing device 105 that may be based in part on the text 165a on the screen 110a.

The context may be that the cursor is located at the end of an incomplete word, such as "ov." In this instance, the user may be unlikely to press the space bar 130a because the user is typing and the cursor is located at the end of an incomplete word. The context may be based on the location of the user's fingers 140a. Because the user's fingers 140a are resting on the home keys 145a, the user may be in a typing position and thus more likely to press the space bar 130a. The context may be based on the location of the user's palms 155a. Because the user's palms 155a are located on the palm rests 160a, the user may be in a typing position and thus more likely to press the space bar 130a than interact with a touchpad.

The computing device 105a may weigh each of these above-described context to determine an overall context. In this instance, the computing device 105a may weigh the text on the screen and the location of the cursor more than the location of the user's palms 155a and/or the location of the user's fingers 140a. In some implementations, because the keyboard 120a is a touch sensitive input device, the user may only be able to rest the user's palms 155a on the inactive areas of the input device such as the palm rests 160a. In this case, the computing device 105a may be unable to determine the location of the user's fingers 140a. In some implementations, the touch sensitive input device may be able to detect the pressure of various touches. In this instance, the user may be able to rest the user's fingers 140a on the home keys 145a without activating the keys. The user may be able to increase the pressure to activate a key. In some implementations, the touch sensitive input device may be able to detect the presence of fingers, palms, or other parts of the hands. In this instance, the user may not have to directly touch the touch sensitive input device but instead be within a threshold distance of the touch sensitive input device for the touch sensitive input device to detect the presence of the user. In some implementations, any of the functionalities achieved by touch may be achieved by presence.

Based on the context of the computing device 105a being related to the user typing and being in the middle of a word, the computing device 105a maintains the space bar active area 170a to be the size and shape of the space bar 130a outlined on the touch sensitive input device. In this instance, to input a space, the user selects the space bar 130a by contacting the touchscreen within the area outlined by the space bar 130a. If the user contacts the touchscreen at an area outside the space bar 130a, such as the trackpad 125a, then the computing device 105a interprets the input as a trackpad 125a input.

Computing device 105b illustrates the computing device 105b after the user has completed typing the word "over." In this instance, the user may be likely to press the space bar 130b because the user is typing and the cursor is located at the end of a complete word. The context may be based on the location of the user's fingers 140b. Because the user's fingers 140b are resting on the home keys 145b, the user may be in a typing position and thus more likely to press the space bar 130b than if the user's fingers 140b were not resting on the home keys. The context may be based on the location of the user's palms 155b. Because the user's palms 155b are located on the palm rests 160b, the user may be in a typing position and thus more likely to press the space bar 130b.

The computing device 105b may weigh each of these determined contexts differently to determine an overall context. In this instance, the computing device 105b may weigh the text on the screen and the location of the cursor more, less, or the same as the location of the user's palms 155b and/or the location of the user's fingers 140b. Based on the context of the computing device 105b being related to the user typing and being at the end of a word, the computing device 105b increases the space bar active area 170b to be greater than the size and shape of the space bar 130b outlined on the touch sensitive input device. In this instance, to input a space, the user selects the area outlined by the active area 170b that includes space bar 130a and a portion of the trackpad 125b. If the user selects the area outside the active area 170b, such as the portion of the trackpad 125a that is below the active area 170b, then the computing device 105b interprets the input as a trackpad 125b input (e.g., by moving the mouse cursor or providing a mouse cursor "click").

Figure 2:
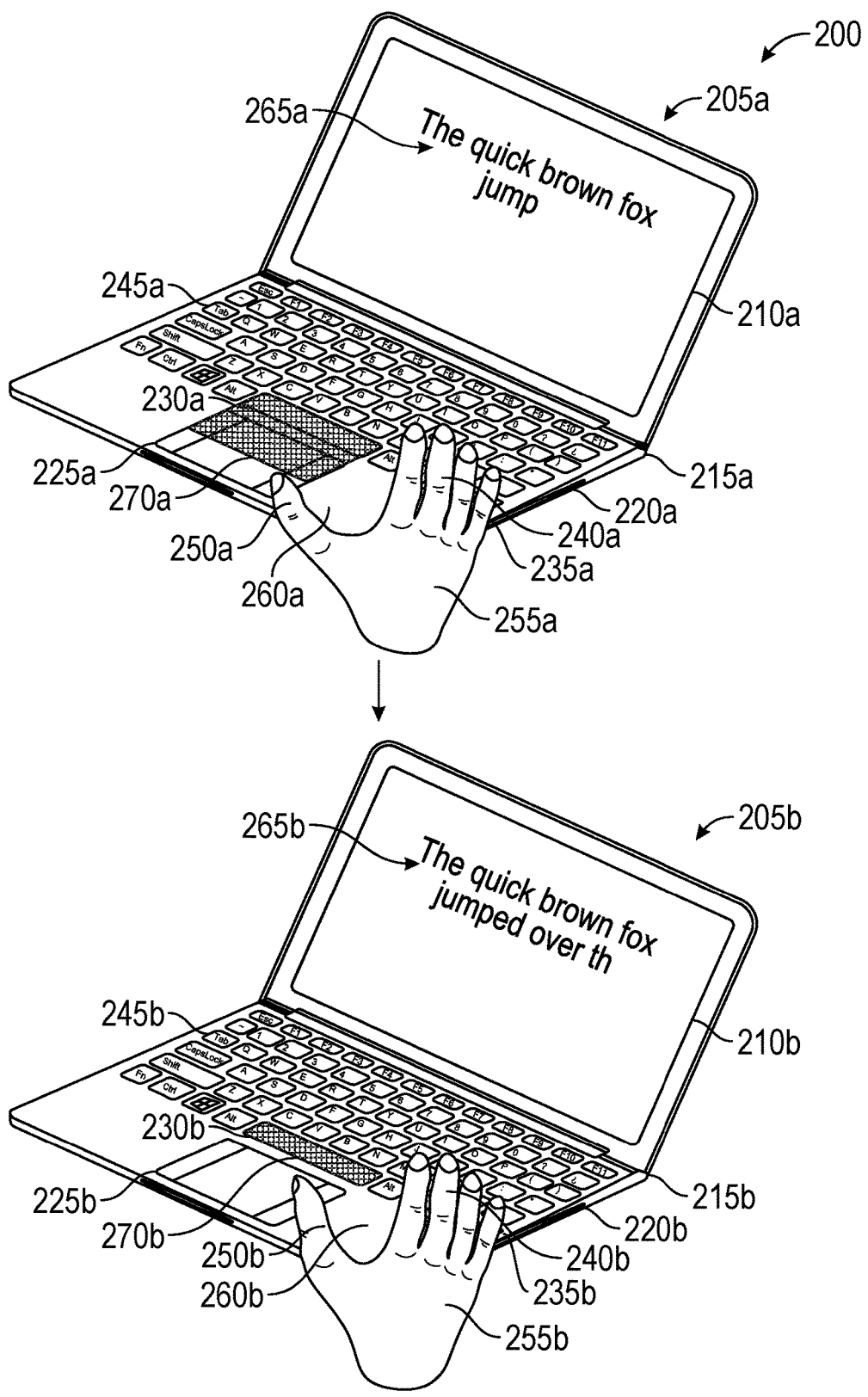

FIG. 2 illustrates an example computing device 205 with a dynamic space bar. Briefly, and as described in more detail below, the computing device 205 uses the context of the computing device 205 to determine whether a touch input near a space bar is a selection of the space bar or a selection of the trackpad.

The configuration of computing device 205 is similar to computing device 105. The screen 210 is hinged to the touch sensitive input device that includes the keyboard 220 and trackpad 225. The space bar active area 270 is dynamic and changes with the context of the computing device. For example, the space bar active area 270 includes a portion of the trackpad 225 when the context includes an incomplete word before the cursor. The space bar active area 270 only includes the space bar when the context includes a complete word before the cursor.

Computing device 205a illustrates the computing device 205a after the user has typed the complete or incomplete word "jump." "Jump" may be followed by a suffix such as "ed," or "jump" may be complete. In this instance, computing device 205a may adjust the space bar active area 170a to include a portion of the trackpad 225a based on more than just the completeness of the word before the cursor. Additional factors to determine the context may be based on the user's fingers 240a being located on the home keys 245a (or within a determined distance thereof) and/or the user's palms 255a being located on the palm rests 260a. Using one or both of these factors in combination with the uncertainty of "jump" being complete or incomplete, the computing device 205a determines that the user is more likely to select the space bar 230a instead of the trackpad 225a. Accordingly, the computing device 205a may expand the space bar active area 270a to include an upper portion of the trackpad 225a.

With the expanded space bar active area 270a, the user may select the top portion of the trackpad 225a and the computing device 205a interprets the selection as a selection of the space bar 230a. In this instance, the user's thumb 250a selects a lower portion of the trackpad 225a. Because the selection of the trackpad 225a is below the expanded space bar active area 270a, the computing device 205a interprets the selection as a selection of the trackpad 225a. One of the factors that is used to determine a size of the space bar active area 270 may be whether a most-recent input has been an input to the trackpad 225a. As such, after user selection of the trackpad 225, the computing device 205 may reduce a size of the space bar active area 270 with respect to a size of the space bar active area 270 before the user selection of the trackpad 225a.

Computing device 205b illustrates the computing device 205b after the user has typed the incomplete word "th." The computing device 205b may adjust the space bar active area 270a to only include the space bar 230b based on decreased likelihood of the user selecting the space bar 230b while the user is in the middle of an incomplete word, such as "th." Additional factors to determine the context may be based on the user's fingers 240b being located on the home keys 245b and/or the user's palms 255b being located on the palm rests 260b. Using one or both of these factors in combination with a determination that a recent user input has provided the incomplete word "th," the computing device 205b may determine that the user is more likely to intend to select the trackpad 225b if the user selects the portion of the keyboard 220b that includes the space bar 230b and the trackpad 225b. Accordingly, the computing device 205b may set the space bar active area 270b to only include the space bar 230b (or less than the region indicated by printed or virtual graphics as representing the space bar 230b).

With the space bar active area 270b only including the space bar 230b, the user may select the top portion of the trackpad 225b and the computing device 205b interprets the selection as a selection of the trackpad 225a. In this instance, the user's thumb 250b selects an upper portion of the trackpad 225b that may, in some contexts, be included in the space bar active area 270b. Because the selection is within the trackpad 225b area and the space bar active area 270b only includes the space bar 230b, the computing device 205b interprets the selection as a selection of the trackpad 225b.

Figure 3:
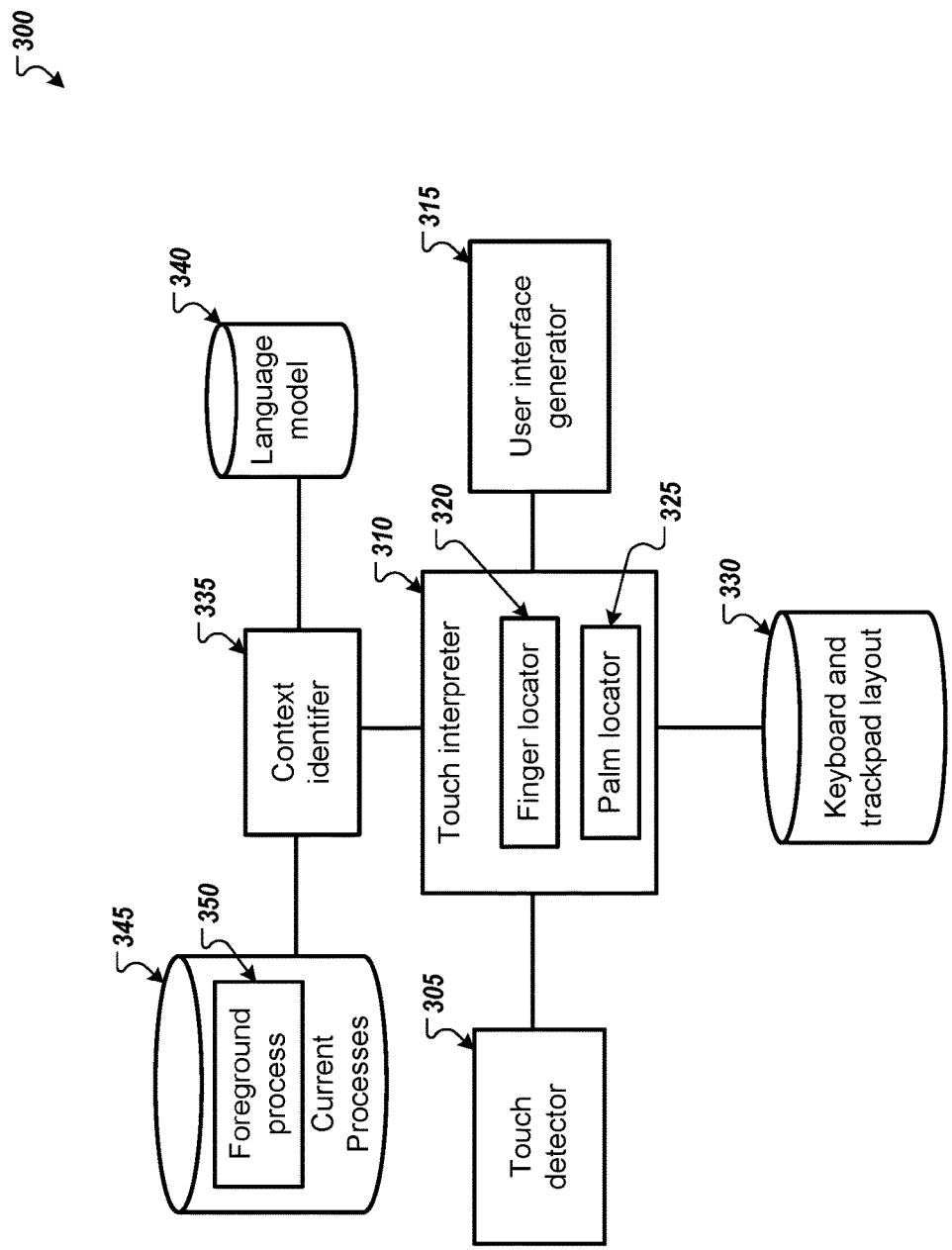
FIG. 3 illustrates an example system for implementing a dynamic space bar.

FIG. 3 illustrates an example system 300 for implementing a dynamic space bar. The system 300 illustrates the various components of a system that has a dynamic space bar. For example, the system 300 may be similar to computing device 105 of FIG. 1 or computing device 205 of FIG. 2. In some implementations, the system 300 may be any device with a touch screen input such as a mobile phone, tablet, or similar device.

The system 300 includes a touch detector 305. The touch detector 305 is configured to detect the location and pressure of touch received through a touch sensitive input device. The touch sensitive input device may be a capacitive touch device or a resistive touch device. The touch detector 305 outputs a start point and end point for each touch event. Additionally, the touch detector 305 outputs the pressure of the touch at each location of the touch event. In the event that the user touches the screen at different locations at the same time, the touch detector 305 may output touch data for each location. For example, a user may touch the touch sensitive input device at one location, drag the user's finger to another location, and remove the user's finger from the touch sensitive input device. In this instance, the touch detector 305 outputs data indicating the path of the user's finger and the pressure of the touch along the path. In instances where the touch may be larger than a finger, such as a palm, the touch detector 305 may output a region where the user contacts the touch sensitive input device as well as the pressure of each location within the region.

The touch detector provides the touch data to the touch interpreter 310. The touch interpreter 310 interprets the touch data and determines the action for the user interface generator 315 to output for display. The touch interpreter 310 receives data from several modules and uses data from those modules to improve interpretation of the touch data.

The touch interpreter 310 also uses the finger locator 320 and the palm locator 325 to determine the location of the fingers, thumbs, and palms based on the received touch data. For example, the touch detector 305 may provide coordinates of a location of a touch, the corresponding pressure, and the size of the touch. The finger locator 320 may compare the location, pressure, and size to various touch ranges and thresholds to determine whether the touch was a finger or a thumb. Similarly, the palm locator 325 may compare the location, pressure, and size to various touch ranges and thresholds to determine whether the touch was a palm. In some implementations, the touch interpreter 310 may receive enough data from the finger locator 320 and palm locator 325 to determine a location of a user's hands by identifying each of the fingers, the palm, and the thumb. In some implementations, the touch interpreter may use various distance ranges and thresholds to identify each of the fingers, the palm, and the thumb. In some implementations, each of the finger, palm, and thumb labels may include a confidence score that indicates a likelihood that, for example, a touch corresponds to the thumb. The touch interpreter 310 may use compare the confidence scores to various thresholds and ranges when determining the action and instructions to provide to the user interface generator 315.

In some implementations, the finger locator 320 and the palm locator 325 may calculate hand and finger angles in addition to, or in place of, hand and finger position. For example, the finger locator 320 and the palm locator 325 may calculate that the angle between the user's hands is sixty degrees as measured along axes interesting each middle finger and palm pair. As another example, the reference lines for the angles may be defined by a line intersecting the palm of the right hand, the middle finger of the right hand, and the middle finger of the left hand, and a line intersecting the palm of the left hand and the middle finger of the left hand.

The touch interpreter 310 receives data from the keyboard and trackpad layout module 330. The keyboard and trackpad layout module 330 provides data related to the layout of the keyboard and trackpad on the touch sensitive input device. In instances where the keyboard and trackpad are painted on the touch sensitive input device, the keyboard and trackpad layout module 330 provides the same data to the touch interpreter 310. In instances where the keyboard and trackpad are dynamic, the keyboard and trackpad layout module 330 provides data that indicates the locations of each of the keys on the keyboard and the location of the trackpad. The location data may include coordinates of each of the keys and trackpad. The keyboard and trackpad layout module 330 may also provide the language that the keyboard layout corresponds to. In instances where no keyboard is displayed on the touch sensitive input device, the keyboard and trackpad layout module 330 may provide data indicating that to the touch interpreter 310.

The touch interpreter 310 receives context data from the context identifier 335. The context identifier identifies a context of the system 300. The touch interpreter 310 analyzes the context data, touch data, and keyboard data to determine the action and instructions to provide to the user interface generator 315. In some implementations, the context identifier 335 may generate context data based at least in part on the language model 340. The language model 340 includes vocabularies for various languages. The context identifier 335 may compare the text on the screen of the system 300 to the terms of the vocabulary. In instances where the user is typing and the current typed term corresponds to the prefix of a term in the vocabulary, the context identifier 335 may identify the context as typing a word. For example, the user may type "jum" and the curser may be located after the "m." The context identifier 335 may compare the term "jum" to the vocabulary in the language model 340. The context identifier 335 determines that that "jum" is an incomplete word, and the context of typing a word is provided to the touch interpreter 310. In some implementations, the language of the system 300 may be set to a particular language. In this instance, the context identifier 335 may only have to compare typed term to the language model that corresponds to the selected language to generate the context data.

In some implementations, the context identifier 335 may generate context data based at least in part on the current processes 345 that are running on the system 300. The current processes 340 may include one or more foreground processes 350 and background processes. Some of the background and, in some instances, the foreground processes may include system processes. Some of the foreground processes 350 and background processes may include user applications such as a browser application, email application, word processing application, photo editing application, and other similar user applications. The processes may also include web processes that are running on a server through a browser. The context identifier 335 examines the current processes 345 and foreground processes 350 and generates context data based on the processes. For example, the context data may be running a web email application in a browser in the foreground and running a music player in the background. As another example, the context data may be running a photo editor in the foreground, or running a word processing application in the foreground.

In some implementations, the current processes 345 and foreground processes 350 may also provide data related to locations of a mouse pointer or cursor or both. For example, a word processing application may have a cursor location at the end of "jum." The current processes 345 may provide data describing the location of the cursor as being after "jum" to the context identifier 335. As another example, the mouse pointer may be located in a scroll bar of a browser window. The current processes 345 may provide data describing the location of the mouse pointer as being in the scroll bar of the browser window. In some implementations, the location of the mouse pointer may be specified by a coordinate pair.

The context identifier 335 provides context data related to the touch interpreter 310. The touch interpreter 310 evaluates any combination of one or more of the context data, the finger locations, the palm locations, the thumb locations, and keyboard layout and determines an action and instructions to provide to the user interface generator 315 in response to the touch data received from the touch detector 305. The touch interpreter 310 may compare the received data to a set of rules to determine the appropriate action. Alternatively, or additionally, the touch interpreter 310 may use machine learning and/or neural networks to determine the appropriate action in response to the touch data. In some implementations, the touch interpreter 310 may primarily be configured to determine whether a touch that is located in a trackpad area and within a threshold distance of the space bar is a selection of the trackpad or the space bar.

Based on the identified action, the touch interpreter 310 provides data identifying the action to the user interface generator 315. The user interface generator 315 updates the user interface based on the identified action. For example, if the action is a selection of the space bar, then the user interface generator 315 advances the cursor. If the action is a selection of the trackpad, then the user interface generator 315 selects the object to which the mouse pointer is pointing, moves the cursor to the location of the mouse pointer, or another appropriate action.

In some implementations, the trackpad is configured to receive single clicks and double clicks. The user may enter a single click by tapping inside the space within the trackpad outline. The user may enter a double click by tapping twice inside the space within the trackpad outline. In some implementations, portions of touch sensitive input device within the trackpad outline may be special click regions that the user may activate to perform actions such as scrolling, etc. In some implementations, the effective trackpad size may change during the user input. Because the touch sensitive input device that includes the keyboard and trackpad is a smooth and uninterrupted surface, the effective trackpad area may grow in size to allow the user to drag outside to the trackpad outline. For example, a user may select an object on the screen by double tapping when the mouse pointer is located on the object. The user may hold down the user's finger at the end of the second tap to begin dragging the object. Once the user begins the dragging operation, the effective trackpad area may increase, perhaps to fill the entire touch sensitive input device. While the user drags the object across the screen, the user's finger may move to the letter "k" key or another key. Because the size of the trackpad increased during the drag operation, the letter "k" key is not activated. Instead, the user continues to move the object even when the user's finger is outside the trackpad outline.

In some implementations, the system 300 includes a privacy control module that is configured to regulate access to context data. The user may choose settings for the privacy control module for the context identifier 335 not to consider particular types of information when determining the context. For example, the user may select a setting to prevent the context identifier 335 from accessing the background applications that may be running on the system 300 when determining the context. As another example, the user may select a setting to prevent the context identifier 335 from using previous user input, such as words typed, when determining the context.

Figure 4:
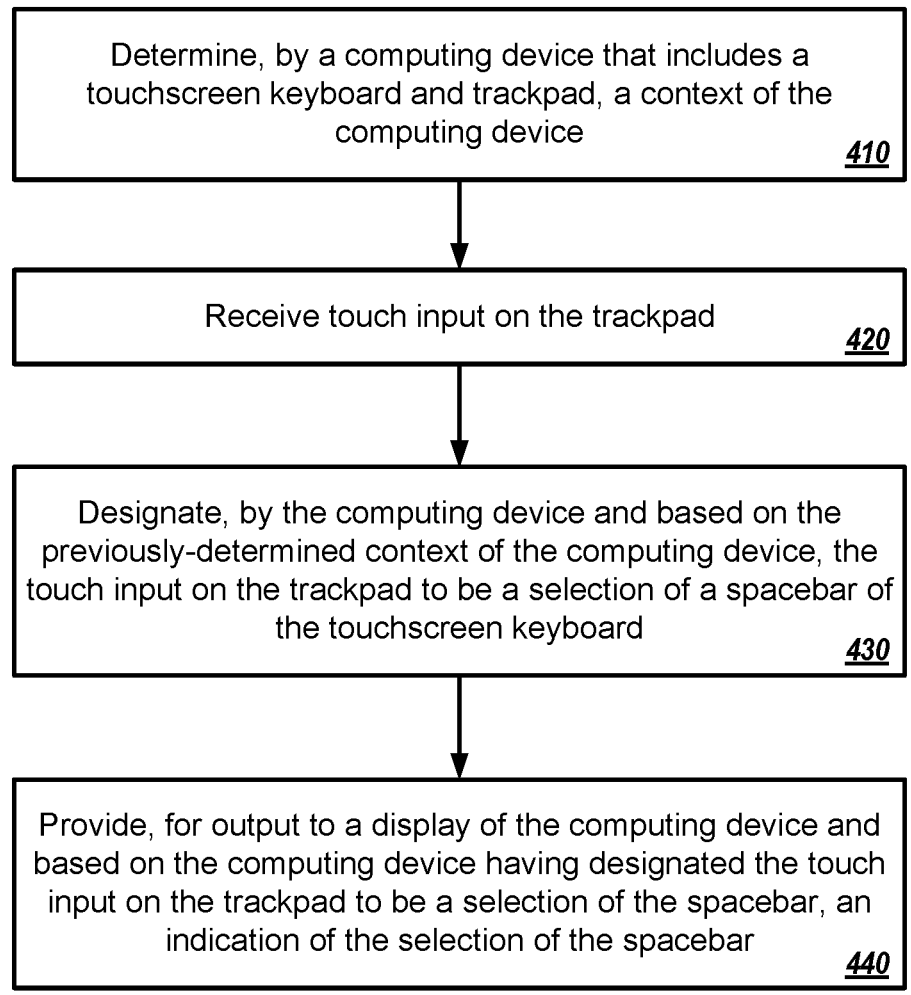
FIG. 4 illustrates an example process for implementing a dynamic space bar.

FIG. 4 illustrates an example process 400 for implementing a dynamic space bar. In general, the process 400 determines whether user input on or near the space bar is a selection of a space bar or a selection of the trackpad located below the space bar and adjacent to the space bar such that no other keys are located between the trackpad and the space bar. The process 400 will be described as being performed by a computer system comprising one or more computers, for example, system 100 as shown in FIG. 1, system 200 as shown in FIG. 2, or system 300 as shown in FIG. 3.

The system, which includes a touchscreen keyboard and trackpad, determines a context of the system (410). In some implementations, the touchscreen keyboard and the track pad are identified by outlines on a single touch sensitive input device. In some implementations, the display of the computing device and the touch sensitive input device are separate. For example, the display and the touch sensitive input device may be connected by a hinge. In some implementations, the keyboard includes a representation of a space bar. In some implementations, the display is a touch sensitive input device. In some implementations, the system determines that the context is that a complete word precedes the cursor. For example, the cursor may be located after "ove." In some implementations, the system determines that the context is that a complete or incomplete word precedes the cursor. For example, the cursor may be located after "jump."

The system receives touch input on the trackpad (420). In some implementations, the system determines that the context of the system is that the touch input is a tap input. A tap input may be where a user contacts the touch screen with the user's finger and releases the finger after a short period, e.g., one millisecond. In some implementations, the touch input may be received in a location outlined by the trackpad and below the space bar. The trackpad may be adjacent to and below the space bar. In some implementations, the system determines that the context of the system is that the user's fingers are contacting the home keys of the keyboard. In some implementations, the system determines that the context of the system is that the user's palms are contacting the palm rests that are located on either side of the trackpad.

The system designates, based on the previously-determined context of the system, the touch input on the trackpad to be a selection of a space bar of the touchscreen keyboard (430). In some implementations, the system designates the touch input as a selection of a space bar based on a complete word preceding the cursor. In some implementations, the system designates the touch input as a selection of a space bar based on the touch input being a tap input (e.g., rather than an input that drags at least a determined distance). In some implementations, the system designates the touch input as a selection of a space bar based on the user's fingers contacting the home keys. In some implementations, the system designates the touch input as a selection of a space bar based on the user's palms being on the palm rests.

In some implementations, the system designates the touch input as a selection a space bar based on a combination of contexts. For example, the context may be that the cursor is at the end of a word that is complete or incomplete, such as "jump." In this instance, the system may designate the touch input as a selection of a space bar based on the user's fingers contacting the home keys and/or based on the user's palms being located on the palm rests. In some implementations, the type of touch inputs (e.g., tap, long press, drag, etc.) combined with the cursor at the end of a complete or incomplete word may not be enough data to determine whether the touch input is a selection of the space bar or trackpad. For example, each context may be associated with a corresponding score, and each of the scores for the various contexts may be weighted and then summed together to determine whether the resulting score exceeds a threshold value at which the input is to be determined a spacebar input even though the input contacted the touchscreen at a location outside of a displayed region of the space bar.

In some implementations, the system may make a designation of the touch input based on a subset of the user's fingers being location on the home keys. For example, if six of the eight user's fingers are location on the home keys, then the system may interpret that as the user's fingers effectively being on the home keys. In some implementations, the six keys, or another number of keys may include specific home keys. For example, the fingers of the left hand should be on the "asdf" keys and two of the fingers of the right hand should be on the home keys for the system to interpret that as the user's fingers effectively being on the home keys. In some implementations, the number of home keys and/or the particular home keys may be selected by user preferences.

The system provides, for output to a display and based on the system having designated the touch input on the trackpad to be a selection of the space bar, an indication of the selection of the space bar (440). For example, the system may advance the cursor. In some implementations, the touch input may be long press or a drag or another type of touchscreen gesture that initiates an action different that an action of a touch input. In this instance, the system may not perform the action of the touchscreen gesture.

In some implementations, the system receives an additional touch input on the trackpad. The system may determine that the context of the system is that a prefix of a word precedes the cursor. In this instance, the system may determine that a selection of the trackpad and within a threshold distance of the space bar is a selection of the trackpad. The system may determine that the touch input is a selection of the trackpad because the user may be unlikely to select the space bar if the word is incomplete.

Figure 5:
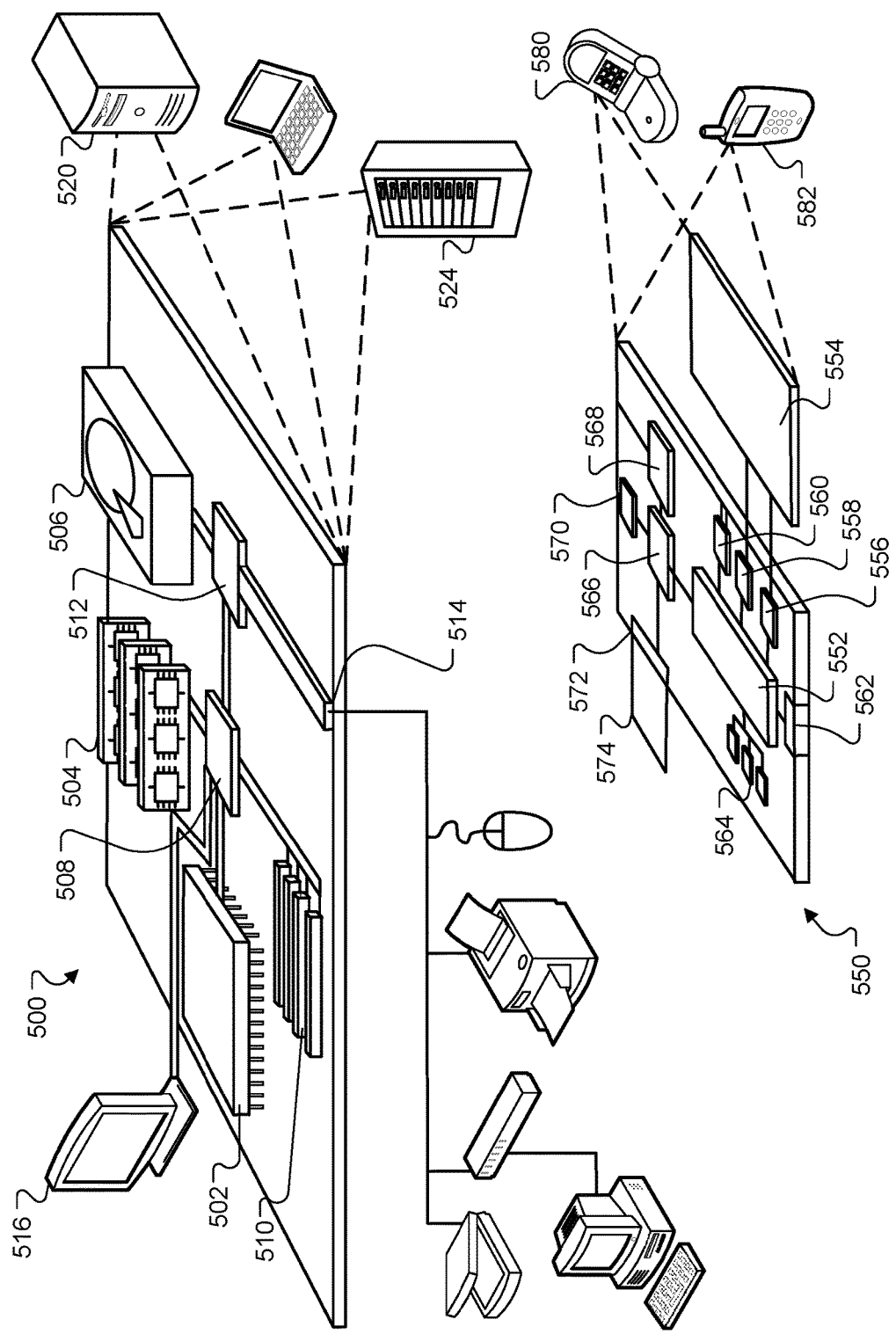
FIG. 5 illustrates an example of a computing device and a mobile computing device.

FIG. 5 shows an example of a computing device 500 and a mobile computing device 550 that can be used to implement the techniques described here. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine-readable mediums (for example, the memory 504, the storage device 506, or memory on the processor 502).

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards. In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device, such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provided as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver. In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
   determining, by a computing device that includes a touch sensitive input device that includes outlines of keys of a touchscreen keyboard and a region designated as a trackpad, a context of the computing device, wherein the outlines of the keys of the touchscreen keyboard include an outline of a space bar;
   receiving touch input within the region designated as the trackpad;
   designating, by the computing device and based on the previously-determined context of the computing device, the touch input within the region designated as the trackpad to be a selection of the space bar; and
   providing, for output to a display of the computing device and based on the computing device having designated the touch input within the region designated as the trackpad to be a selection of the space bar, an indication of the selection of the space bar.

2. The method of claim 1, wherein:
   determining a context of the computing device comprises determining that a complete word precedes a location of a cursor, and
   designating the touch input within the region designated as the trackpad to be a selection of the space bar is based further on determining that a complete word precedes the cursor.

3. The method of claim 1, wherein:
   determining a context of the computing device comprises determining that the touch input within the region designated as the trackpad is a tapping action rather than a dragging action, and
   designating the touch input within the region designated as the trackpad to be a selection of the space bar is based further on determining that the touch input within the region designated as the trackpad is a tapping action rather than a dragging action.

4. The method of claim 1, wherein:
   determining a context of the computing device comprises determining that user fingers are touching within outlines of a predetermined number of home keys of the touchscreen keyboard, and
   designating the touch input within the region designated as the trackpad to be a selection of the space bar is based further on determining that the user fingers are touching within the outlines of the predetermined number of the home keys of the touchscreen keyboard.

5. The method of claim 1, wherein:
   determining a context of the computing device comprises determining that user palms are touching portions within the outlines of the keys of the touchscreen keyboard on either side of the outline of the trackpad, and
   designating the touch input within the region designated as the trackpad to be a selection of the space bar is based further on determining that the user palms are touching portions within the outlines of the keys of the touchscreen keyboard on either side of the trackpad.

6. The method of claim 1, wherein the display of the computing device and the touch sensitive input device are separate.

7. The method of claim 1, wherein:
receiving touch input within the region designated as the trackpad comprises not receiving the touch input at a location that is within the outline of the space bar.

8. The method of claim 7, wherein the region designated as the trackpad is adjacent to and underneath the outline of the space bar.

9. The method of claim 1, comprising:
determining an additional context of the computing device;
receiving additional touch input within the region designated as the trackpad;
designating, by the computing device and based on the additional context, the additional touch input within the region designated as the trackpad to be a selection of the trackpad; and
providing, for output to the display of the computing device and based on the computing device having designated the additional touch input within the region designated as the trackpad to be a selection of the trackpad, an indication of the selection of the trackpad.

10. The method of claim 9, comprising:
receiving another touch input within the outline of the space bar;
based on designating the additional touch input within the region designated as the trackpad to be a selection of the trackpad, designating, by the computing device, the other touch input within the outline of the space bar to be a selection of the trackpad; and
providing, for output to the display of the computing device and based on the computing device having designated the other touch input within the outline of the space bar to be a selection of the trackpad, an additional indication of the selection of the trackpad.

11. The method of claim 9, wherein:
determining a context of the computing device comprises determining that a prefix of a word precedes the cursor, and
designating the touch input within the region designated as the trackpad to be a selection of the trackpad is based further on determining that a prefix of a word precedes the cursor.

12. The method of claim 1, comprising:
based on receiving the touch input within the region designated as the trackpad and based on the computing device having designated the touch input within the region designated as the trackpad to be a selection of the space bar, not performing an action associated with a touchscreen gesture.

13. The method of claim 1, wherein the region designated as the trackpad is defined by an outline of the trackpad.

14. The method of claim 1, wherein the region designated as the trackpad is distinct from the outline of the spacebar.

15. A system comprising:
one or more computers; and
one or more storage devices storing instructions that are operable, when executed by the one or more computers, to cause the one or more computers to perform operations comprising:
determining, by a computing device that includes a touch sensitive input device that includes outlines of keys of a touchscreen keyboard and a region designated as a trackpad, a context of the computing device, wherein the outlines of the keys of the touchscreen keyboard include an outline of a space bar;
receiving touch input within the region designated as the trackpad;
designating, by the computing device and based on the previously-determined context of the computing device, the touch input within the region designated as the trackpad to be a selection of the space bar; and
providing, for output to a display of the computing device and based on the computing device having designated the touch input within the region designated as the trackpad to be a selection of the space bar, an indication of the selection of the space bar.

16. The system of claim 15, wherein:
determining a context of the computing device comprises determining that a complete word precedes a location of a cursor, and
designating the touch input within the region designated as the trackpad to be a selection of the space bar is based further on determining that a complete word precedes the cursor.

17. The system of claim 15, wherein:
determining a context of the computing device comprises determining that the touch input within the region designated as the trackpad is a tapping action rather than a dragging action, and
designating the touch input within the region designated as the trackpad to be a selection of the space bar is based further on determining that the touch input within the region designated as the trackpad is a tapping action rather than a dragging action.

18. The system of claim 15, wherein:
determining a context of the computing device comprises determining that user fingers are touching within outlines of a predetermined number of home keys of the touchscreen keyboard, and
designating the touch input within the region designated as the trackpad to be a selection of the space bar is based further on determining that the user fingers are touching within the outlines of the predetermined number of the home keys of the touchscreen keyboard.

19. The system of claim 15, wherein:
determining a context of the computing device comprises determining that user palms are touching portions within the outlines of the keys of the touchscreen keyboard on either side of the outline of the trackpad, and
designating the touch input within the region designated as the trackpad to be a selection of the space bar is based further on determining that the user palms are touching portions within the outlines of the keys of the touchscreen keyboard on either side of the trackpad.

20. A non-transitory computer-readable medium storing software comprising instructions executable by one or more computers which, upon such execution, cause the one or more computers to perform operations comprising:
determining, by a computing device that includes a touch sensitive input device that includes outlines of keys of a touchscreen keyboard and a region designated as a trackpad, a context of the computing device, wherein the outlines of the keys of the touchscreen keyboard include an outline of a space bar;
receiving touch input within the region designated as the trackpad;

designating, by the computing device and based on the previously-determined context of the computing device, the touch input within the region designated as the trackpad to be a selection of the space bar; and providing, for output to a display of the computing device and based on the computing device having designated the touch input within the region designated as the trackpad to be a selection of the space bar, an indication of the selection of the space bar.

* * * * *